United States Patent [19]

Gudmundsson et al.

[11] Patent Number: 5,193,312

[45] Date of Patent: Mar. 16, 1993

[54] NON-ROTATING GRINDING APPARATUS

[76] Inventors: Sören Gudmundsson, Vårsåddsvägen 2, S-444, 95 Ödsmål; Dag M. Stenmark, Pl 6872B, S-444 91 Stenungsund, both of Sweden; Robert Sjölander, 36 Cameo Street, Oakville, Ontario, Canada, L6J 5Y1

[21] Appl. No.: 720,385

[22] Filed: Jun. 25, 1991

[30] Foreign Application Priority Data

Aug. 17, 1990 [SE] Sweden .............................. 9002687

[51] Int. Cl.⁵ .............................................. B24B 3/33
[52] U.S. Cl. .......................................... 51/120; 51/55
[58] Field of Search ................... 51/55, 54, 31, 120, 51/126, 289 S, 90, 288

[56] References Cited

U.S. PATENT DOCUMENTS

| | | | |
|---|---|---|---|
| 1,635,469 | 7/1927 | Ericsson | 51/120 |
| 3,111,789 | 11/1963 | Harmon | 51/90 |
| 3,797,177 | 3/1974 | Hoffman | 51/120 |
| 4,858,388 | 8/1989 | Bice | 51/55 |
| 5,070,654 | 12/1991 | Manquist | 51/120 |

FOREIGN PATENT DOCUMENTS 0365497 4/1990 European Pat. Off. .
3732710 4/1988 Fed. Rep. of Germany .

Primary Examiner—Robert A. Rose

[57] ABSTRACT

A grinding apparatus is housed in a casing (24). The grinding machine (3) with its grinding pin (15) is journalled in a rotatable attachment (2) such as to be imparted a rocking motion. The apparatus is carried by a pair of arms (7) which are freely movable in a generally horizontal plane, the one arm (9) being mounted for vertical movement on a stand (6). This vertical movement can be adjusted to produce a balanced effect and to deliver a downwardly acting force, feed pressure. Both the balancing and the feed pressure are achieved with the aid of one single piston-cylinder device (11).

7 Claims, 3 Drawing Sheets

NON-ROTATING GRINDING APPARATUS

TECHNICAL FIELD

The present invention relates to apparatus of the kind intended to grind e.g. the buttons of button bits and the like. More specifically, the invention relates to an apparatus of the kind which includes a rotary device which is carried for vertical adjustment by an arm or lever system journalled on a stand or frame structure. The vertical shaft of the rotary device is connected to a grinding machine by means of an attachment, the output shaft of said machine carrying a grinding pin. The grinding surface of said pin is intended to be active at the point of intersection between the respective longitudinal axes of the rotary device and the grinding machine. The grinding pin is self-centering on the button to be ground.

BACKGROUND ART

Self-centering button-grinding apparatus of this kind are known from SE-A 8803684-3 and SE-A 8902794-0. In apparatus of this known kind, the whole of the grinding machine moves in an orbital path while being firmly attached to the rotational shaft of the rotary device. This construction creates certain problems, among other things because of the centrifugal forces to which the grinding machine is subjected, but primarily because it is necessary to provide the output shaft of the rotary device with a swivel coupling and to provide on said shaft various axially extending passages for the delivery of driving and cooling agents to the grinding machine. Another drawback with this known construction is that the rotating grinding machine constitutes a latent risk of injury to the machine operator.

Consequently, there is a strong desire to avoid these drawbacks and also to simplify the button grinding apparatus in general aspects, without departing from its self-centering function or from the ease of handling which enables the operator of such apparatus to manoeuvre the apparatus without the use of excessive force and which is characteristic of the button grinding apparatus taught by said patent specification.

An apparatus for renovating the buttons of button bits is also known from US-A 4,858,388, this apparatus including a bracket structure which can be raised and lowered along a pylon or post. The bracket is carrying a rotatable device whose shaft coacts with a drive means such as to cause a laterally mounted grinding machine to execute rocking, orbital motion. This is achieved by attaching the grinding machine to an annulus such that the drive shaft of the grinding machine will extend obliquely to the vertical line of the renovating apparatus. The annulus is rotatably journalled in the bracket and is driven by the shaft-drive of the rotatable device. The grinding machine is supported on journals in the central opening of the annulus and the grinding machine is prevented from rotating by means of an elastic coupling which couples the machine to the bracket structure.

Besides the drawback with this known apparatus in that the intrinsic weight of the apparatus and the friction generated in the bearings counteract the self-centering effect and the operator has difficulty in maneuvering the apparatus it is encumbered with a number of troublesome constructional problems, primarily caused by the lateral positioning of the grinding machine and its complicated journalling means.

DISCLOSURE OF THE INVENTION

An aspect of the present invention is to avoid the aforesaid drawbacks in that the co-rotating attachment on the output shaft of the rotary device is provided with a rotation compensating bearing arrangement by means of which the grinding machine is supported at its upper extremity, when seen vertically. The rotation compensating arrangement transfers a non-rotating rocking movement to the grinding machine from the rotary action of the rotary device.

Another aspect of the present invention is to obtain, distinct from the apparatus taught by the aforesaid U.S. Pat. No. 4,858,388, a highly stable, readily manoeuvred button grinding apparatus, due to the fact that the grinding machine need not be carried by a laterally located element, as in the case of the known apparatus, but has a well-defined mass owing to the fact that its center of gravity lies in the immediate vicinity of the vertical center axis of the rotary device. This improved stability would not be achieved with the known grinding machine journalled in the annulus element, not even if the grinding machine were "suspended" beneath said annulus. Furthermore, such modification of the known apparatus would be difficult to carry out, among other things because of the need to protect the gears.

The bearing arrangement formed in the co-rotating attachment in accordance with the invention is displaceably affixed to the attachment. This enables adjustments to be made to the angle defined between the respective longitudinal axes of the grinding machine and the rotary device, such as to enable the extent of the non-rotating rocking movement to be adjusted from zero and upwards. Manoeuverability of the inventive apparatus is further facilitated by the fact that the arm system solely includes two generally horizontal arms which are freely movable in the horizontal plane and which are mutually connected at one end by means of a vertical hinge. The other or opposite free end of one arm carries the rotary device, whereas the other or opposite end of the other arm is mounted in a manner which enables this end to be raised and lowered in the stand or frame in which the button grinding device is mounted. Raising and lowering of said second arm is effected by means of one single pressure medium operated piston-cylinder device, the piston of which is connected to the bearing by means of which the second arm is journalled to the stand.

This simplified arm construction, consisting solely of two arms and one single piston-cylinder device, functions equally as well as the parallel arm systems described in the aforementioned patent specifications SE-A 8803684-3 and SE-A 8902794-0, without detracting from the self-centering effect achieved with said systems. In addition, there is obtained a more compact construction which can be readily accommodated in a casing or housing.

The work of the operator can be greatly facilitated by providing on the front side of the casing facing towards the operator an instrument panel which includes substantially all of the control and measuring devices required to carry out a button grinding operation.

DESCRIPTION OF PREFERRED EMBODIMENTS

Figure 1:
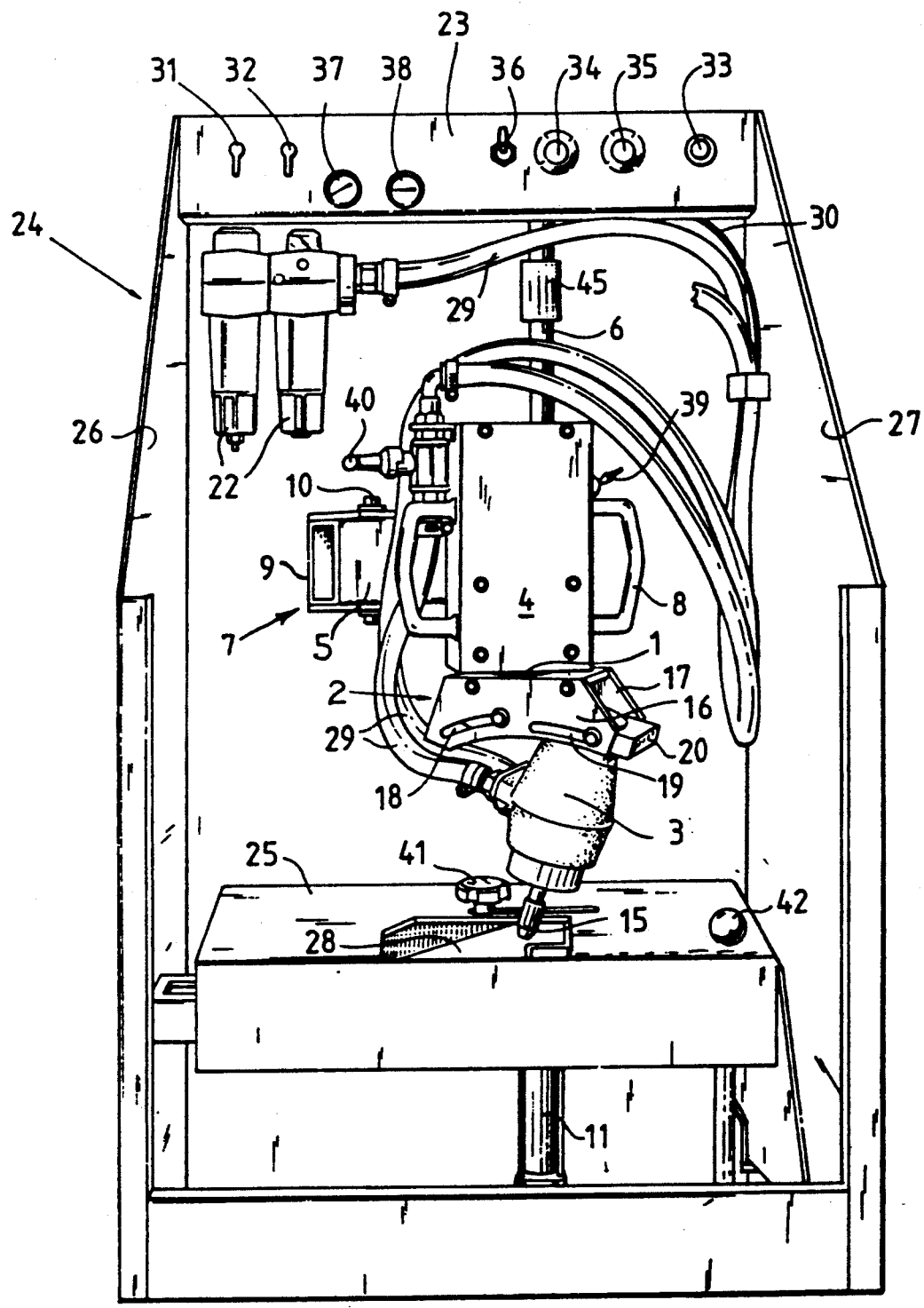
Figure 2:
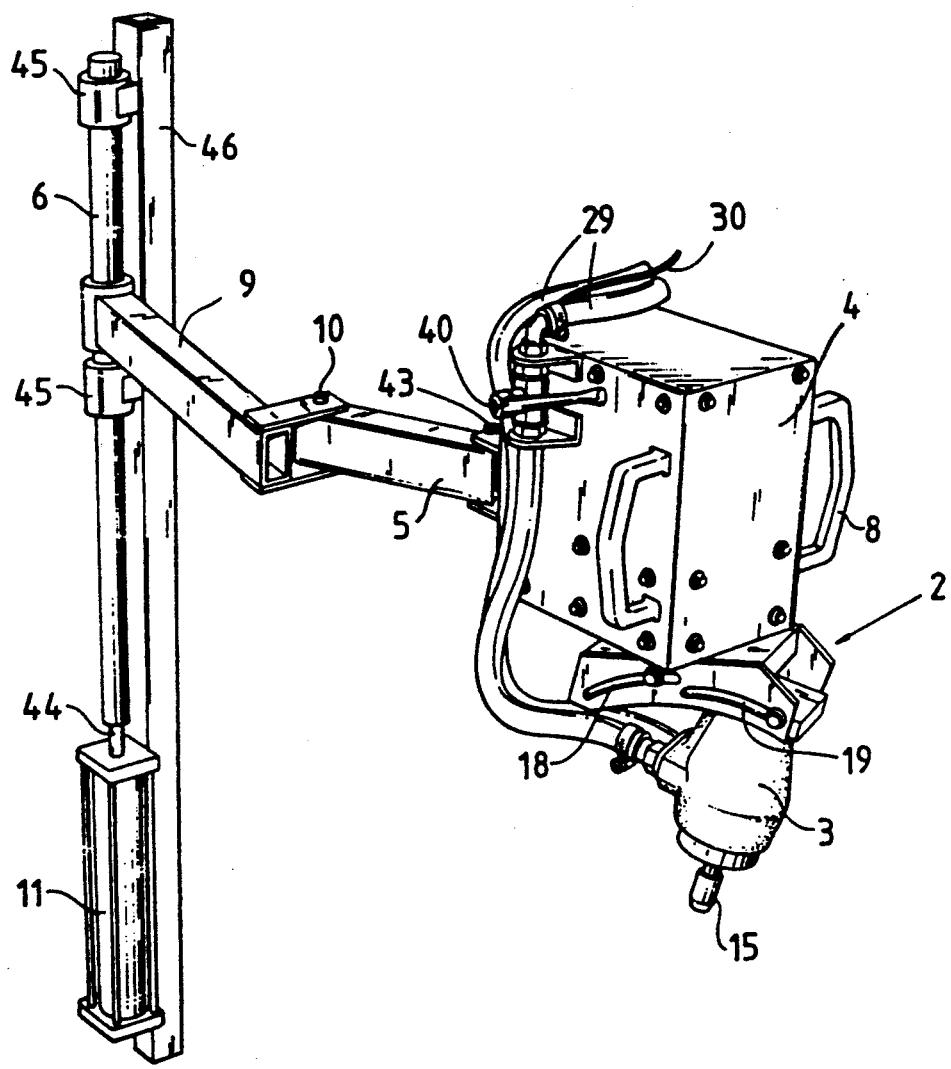
Figure 3:
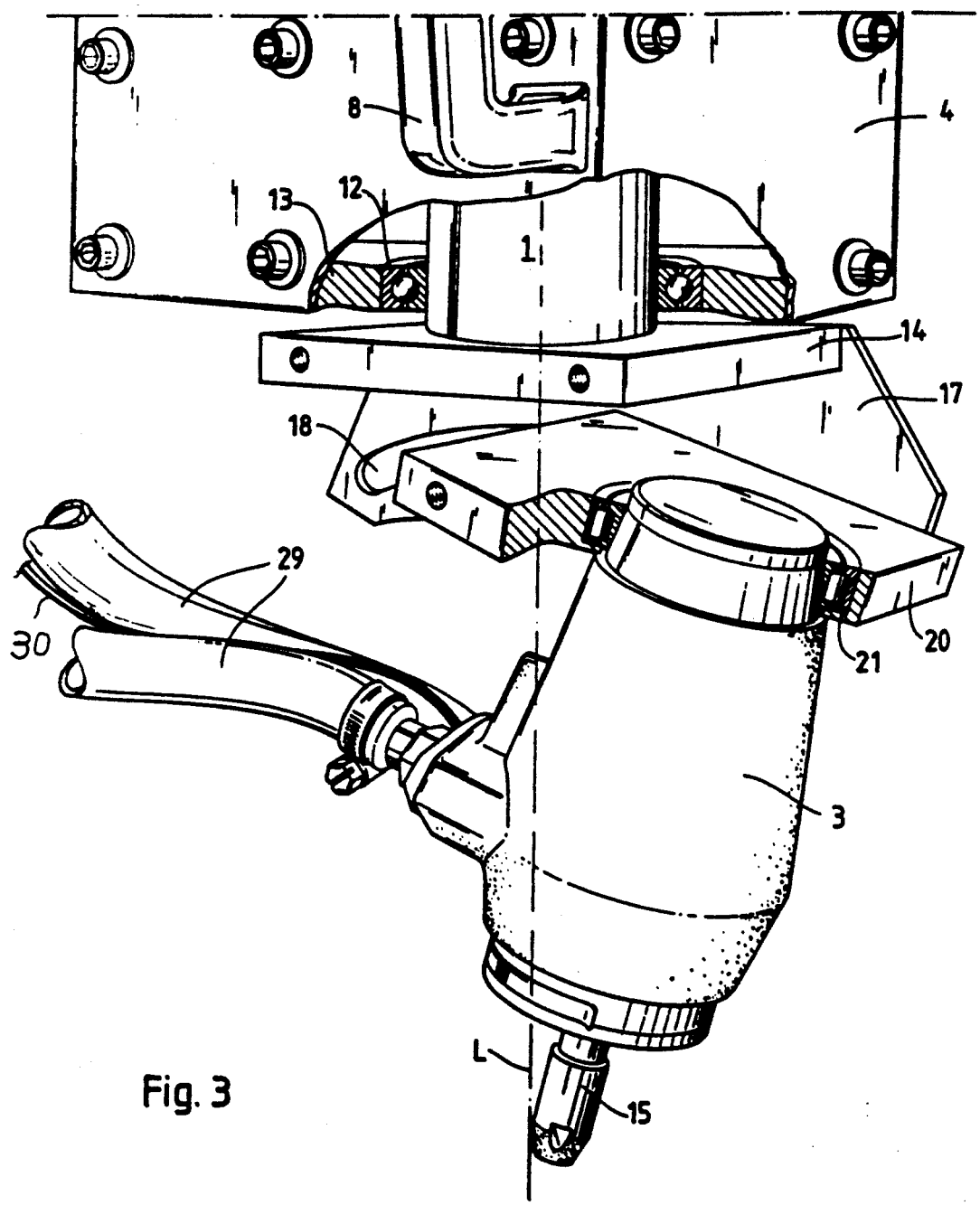

The inventive button-grinding apparatus will now be described in more detail with reference to a preferred exemplifying embodiment thereof illustrated in the accompanying drawings, where FIG. 1 is a front view of the inventive button-grinding apparatus incorporated in a casing;

FIG. 2 is a side view of the same button-grinding apparatus with the casing removed; and FIG. 3 illustrates in detail, and partly in section, the attachment of the grinding machine to the bearing arrangement attachment means.

FIGS. 1 and 2 illustrate a self-centering button grinding apparatus in which a grinding machine 3 is carried by an attachment 2 which is fixedly connected to the rotary output shaft 1 of a rotary device 4. The rotary device 4 is carried at its outer end by an arm or lever system 7 which includes a first arm 5. The second arm 9 of the arm system 7 is journalled on stand means 6 in a manner which enables said arm to be raised and lowered. This raising and lowering movement is controlled by means of one single pressure-medium piston-cylinder device 11 mounted at the foot of the stand means 6.

The two arms 5, 9 of the arm system 7 are mutually connected by means of a vertical hinge means 10, therewith enabling the arms 5, 9 to be swung freely in the horizontal plane. The bearing by means of which the second arm 9 is journalled to the stand means 6 is also freely pivotal in the horizontal plane, as is also the actual grinding assembly itself, the rotary device 4 of which assembly favourably being journalled on the arm 5 for horizontal pivotal movement by means of a second, vertically extending hinge 43.

The stand means 6 comprises a hollow or solid rod of circular cross-section and is connected to the piston 44 of the piston-cylinder device 11. The rod 6 is preferably secured to the second arm 9 by means of a locking screw (not shown). The connection between the piston 44 and the rod 6 may be entirely free, i e the rod 6 rests on the end of the piston 44, although said rod is preferably affixed so that the rod 6 and the piston 44 will be forced to accompany one another in all movements. The rod 6 can be moved vertically is journalled in bearing sleeves 45 for pivotal movement in a horizontal plane. Similar to the piston-cylinder device 11, the bearing sleeves 45 are fixedly attached to the pylon or post 46 which forms part of the backpiece of the casing 24 in which the grinding apparatus is housed.

FIG. 3 illustrates in more detail the manner in which the grinding machine 3 is journalled to the rotary device 4. This detailed view is free of unnecessary parts and illustrates other parts in section, so as to show the compact construction more clearly. The rotating output shaft 1 of the rotary device 4 is journalled in the bottom plane 13 of the housing of said rotary device 4 by means, inter alia, of a bearing 12 and is driven by a motor (not shown). Mounted on the end of the rotary shaft 1 extending from the housing is a plate 14 which carries attachment plates 16, 17 along two mutually opposite sides thereof, only the one plate 17 being shown in FIG. 3. The attachment plates 16, 17 and the plate 14 together form the aforesaid attachment 2. Each of the attachment plates 16, 17 is provided with two arcuate grooves 18, 19 for removable attachment of a bearing plate 20 in which the grinding machine 3 is pivotally mounted in a bearing 21.

Pressure medium is delivered to the grinding machine 3 in a conventional manner, through supply lines 129 and a grinding pin 15 is mounted on the output shaft of said machine. The angle defined by the grinding pin 15 with the longitudinal axis L of the rotating shaft 1 can be adjusted by displacing the bearing plate 20 in the grooves 18, 19 of the attachment plates 16, 17. This enables the longitudinal axis of the grinding pin 15 to be made coincident with the longitudinal axis L of the rotary shaft 1, or to be moved to an outer extremity of the grooves 18, 19 such as to define a maximum angle, normally 30°, with the longitudinal axis L of the shaft 1.

The shaft 1 is normally rotated at a low speed, while the grinding pin 15 is rotated at a relatively high speed. Although the rotary shaft 1 and the parts 14, 17, 18, 20 (the attachment 2) carried thereby rotate through on a full revolution, i e through 360°, the grinding machine 3 will not rotate through one complete revolution but will instead execute solely a rocking movement, due to the bearing 21 and the rotation preventing hoses or pipes 29. This rocking movement is sufficient to achieve the grinding result earlier achieved with the known arrangements through their orbital rotational movement.

With continued reference to FIGS. 1 and 2 it is obvious that the preferred embodiment of the inventive grinding system is fluid operated and preferably pneumatically operated. However, the man skilled in the art may well understand that the driving and control of the grinding apparatus can be of hydraulic as well as pneumatic type. Thus, compressed air is delivered, via mist lubricating devices 22, to the supply lines 29 for both the rotary shaft 1 and the operation of the grinding machine 3, and to the piston-cylinder device 11. The system also includes a coolant supply line 30, preferably water, said coolant being discharged through the tubular grinding pin 15, via the grinding machine 3, onto the surface being ground.

Measuring and control device are mounted on a panel 23 which forms a part of the casing 24 in which the grinding machine is housed. Thus, the panel includes a switch 31 with OFF and ON positions for water supply via the line 30. The panel further includes a switch 32 for starting and stopping the orbital movement, i e for stopping and starting the drive motor which drives the rotary shaft I. Also included on the panel is a knob 33 for setting the speed of the orbital movement/the rotary shaft i. Two knobs, 34, 35 are provided respectively for setting the feed pressure generated by the piston-cylinder device 11 on the grinding pin 15 during the grinding process, and also the balancing pressure which the piston-cylinder device 11 is intended to generate when manually moving and adjusting the grinding machine. The balancing pressure is intended to equalize the intrinsic weight of the grinding machine. Also mounted on the panel 23 is a switch 36 for releasing and locking a further piston-cylinder device described herebelow, this further device functioning to hold firmly the object to be ground. Two manometers 37, 38 are provided respectively for indicating the primary pressure and supply pressure of the compressed air.

The piston-cylinder device 11 is switched between its supplypressure mode and its balancing-pressure mode by means of a switch 39 mounted on the housing of the rotary device 4 in the immediate vicinity of one of the two handles 8 that are provided to facilitate manual handling of the grinding machine. Also mounted on the housing is a regulator 40 which functions to start the grinding pin 15 and to adjust the rotational speed of said pin.

Also mounted in the casing 24 housing the inventive grinding apparatus is a table 25 on which the object to be ground (for instance a button bit) is firmly clamped. The table 25 is pivotally mounted on the side walls 26, 27 of the casing 24 and is constructed in the manner known from Swedish Patent Application No. 8902794-0. Thus, the table arrangement includes an opening 28, a locking piston-cylinder device and a displaceable floor, said floor being manoeuvred by means of a lever device 41. The angle of inclination of the table 25 can be adjusted by means of a lever 42.

According to the present invention, the grinding machine is handled substantially in the same manner as that described with reference to the arrangement according to Swedish Patent Application No. 8902794-0. Although handling of the grinding machine according to this Swedish patent application is highly satisfactory, the grinding machine according to the present invention has a much more effective construction, both from the aspect of assembly and from the aspect of cost. The handling and function of the machine are described briefly in the following.

It is assumed that when starting up the inventive grinding apparatus, the compressed air supply has been switched on and that the balancing pressure and supply pressure have been preset to desired values, by means of the knobs 34, 35 and that the rotational speed has been set by means of the knob 33. It is also assumed that the operator will have turned the switch 39 to its BALANCING position, so as to enable the entire apparatus to be moved readily in a vertical direction along the stand or rod 6. The operator will also have manually moved the grinding machine 3 away from the table opening 28, and will have inclined the table 25 in a forward direction (in a direction towards the viewer with respect to FIG. 1) by means of the lever 42, for the purpose of loading the machine with an object to be ground. The switch 36 is set to its FREE position, in which the piston-cylinder device is in its non-locked position. A floor is drawn forwards by means of the lever 41, if so required.

The operator fits the object to be ground in the opening 28, for instance a button bit having a plurality of buttons. The button bit is locked in a suitable working position, by switching the switch 36 to its LOCK position, wherein the further piston-cylinder device locks the button bit against the walls of the opening 28. The operator then adjusts the table to a suitable angular position with the aid of the lever 42, and locks the table in this position. Using the handle 8, the operator then brings the grinding pin 15 of the grinding machine 3 into line with the button on the button bit to be ground first. The switch 32 is then moved to its ON position, whereupon the machine begins its locking movement. The coolant liquid is switched on by switching the switch 31 to its ON position. Rotational movement of the grinding pin 15 is started by means of the regulator 40, whereafter the switch 39 is moved to its FEED position. The piston-cylinder device will then automatically bring the grinding pin 15 into abutment with the button to be ground and as a result of the constantly free lateral or horizontal movement of the arms 5, 9, there is obtained a self-centering effect with respect to the grinding pin 15 on the button to be ground.

When grinding of the first button bit is terminated, the operator moves the switch 39 to its BALANCING position and then lifts the machine vertically and, at the same time, aligns the grinding pin 15 laterally against a further button on the button bit. It may also be necessary to adjust the angular position of the table 25 and/or the angular position of the grinding machine 3 relative to the longitudinal axis L, depending on the actual position of the button to be ground on the mantle surface of the button bit. Subsequent to having made any necessary adjustment such that the grinding pin 15 will be in register with the further button to be ground, the switch 39 is again moved to its FEED position and a new grinding process is carried out.

When all the buttons on the button bit have been ground in the described manner, the operator may either shut down the machine, if no more bits are to be ground, or may continue grinding with a further button bit, simply by turning the switch 39 to its BALANCING position, lifting the machine and moving the same away from the table 25. This enables the ground bit to be removed from the opening 28, by deactivating the further piston-cylinder device, by moving the switch 36 to its FREE position. Optionally, the table 25 may be released and forwardly inclined by means of the lever 42, in the aforedescribed manner, so as to facilitate removal of the ground bit and the insertion of a new bit.

The inventive apparatus has a relatively compact construction which requires only a small space and which can be readily transported, without any form of dismantling whatsoever. When transporting the system, the single opening contained in the casing 24 housing the apparatus, namely the opening facing the viewer in FIG. 1, can be fitted with a protective cover, which is preferably constructed so as also to cover the instrument panel 23.

Although the inventive apparatus has been described and illustrated with respect to a preferred embodiment thereof, it will be understood that this embodiment is simply intended to exemplify the manner in which the inventive concept defined in the following claims can be realized. Naturally, various modifications can be made without departing from the concept of the invention. For instance, the aforedescribed attachment 2 for the grinding machine 3 can be used in a system known generally from Swedish Patent Application No. 8902794-0.

We claim:

1. Grinding apparatus, for grinding buttons on a button bit, comprising:
   a) a rotary device having a longitudinal axis, said rotary device bearing a downwardly extending first vertical output shaft, the rotary device being carried for adjustment by an arm system which is journalled on a stand, the vertical output shaft of the rotary device being connected via an attachment to a grinding machine;
   b) a grinding machine having a longitudinal axis with a vertical upper end, said grinding machine being connected to the output shaft of the rotary device, said grinding machine likewise bearing an output shaft with a grinding pin thereon, a grinding surface of the pin lying on a point of intersection of respective longitudinal axes of the rotary device and the grinding machine, said grinding pin being self-centered on an object to be ground by means of the arm system, wherein the vertical upper end of the grinding machine beneath the rotary device is carried by a rotation compensating bearing arrangement;

c) a compensating bearing arrangement including a corotating attachment thereon, said bearing arrangement enabling the grinding machine to execute a non-rotating rocking movement during operation of the rotary device.

2. Apparatus according to claim 1, characterized in that the bearing arrangement is displaceably fixed to the co-rotating attachment for adjustment of the grinding machine, such that the longitudinal axis of said machine can be adjusted to various angular positions with respect to the longitudinal axis of the rotary device.

3. Apparatus according to claim 1, characterized in that the bearing arrangement is suspended from pins which engage in arcuate grooves which present centres in the point of intersection between the respective longitudinal axes of the rotary device and the grinding machine.

4. The grinding apparatus of claim 1 wherein said arm system includes two generally horizontal arms which are freely movable in a horizontal plane and which are mutually connected by means of a vertical hinge, wherein one of said arms at its opposite end carries the rotary device and the other of said arms is mounted by a journal means at its opposite end to the stand for vertical movement along said stand, said vertical movement being effected by means of a pressure piston-cylinder device, the piston of which is connected to the journal means of said other arm on the stand.

5. Apparatus according to claim 4, characterized in that a bearing by means of which said arm is journalled to the rotary device, also enables the arm to be pivoted freely in the horizontal plane through the intermediary of a further vertical hinge means.

6. Apparatus according to claim 4, characterized in that the stand is connected with a casing which has two mutually opposing side walls and a front side and which essentially houses said apparatus; and a tiltable table wherein objects to be ground are mounted in a lower part of said casing and wherein the grinding pin of the grinding pin of the grinding machine is located above said table when said pin occupies its active position.

7. Apparatus according to claim 6, characterized by an instrument panel provided on a front side of the casing facing the operator, above the apparatus per se and in the form of a connecting element between the two side walls, said panel having mounted thereon substantially all control and measuring devices for operation of the apparatus.

* * * * *